Jan. 16, 1962  E. H. HARTEL  3,017,172
SHOCK ABSORBER

Filed Nov. 3, 1958  2 Sheets-Sheet 1

INVENTOR.
ERWIN H. HARTEL
BY
ATTORNEY

Jan. 16, 1962  E. H. HARTEL  3,017,172
SHOCK ABSORBER

Filed Nov. 3, 1958  2 Sheets-Sheet 2

INVENTOR.
ERWIN H. HARTEL
BY
ATTORNEY

Patented Jan. 16, 1962

3,017,172
SHOCK ABSORBER
Erwin H. Hartel, Middleburg Heights, Ohio, assignor to Cleveland Pneumatic Industries, Inc., Cleveland, Ohio, a corporation of Ohio
Filed Nov. 3, 1958, Ser. No. 771,394
9 Claims. (Cl. 267—64)

This invention relates to shock absorbers and more particularly to a shock absorber and spring combination utilizing a liquid spring to pressurize the device.

It is an important object of this invention to provide a shock absorbing spring mechanism which is lightweight and durable.

It is still another object of this invention to provide a mechanism which utilizes a liquid spring for the energy absorption wherein means are provided to increase the stroke effect of the liquid spring so that a relatively long stroke device can be provided with a relatively short stroke liquid spring.

Further objects and advantages will appear from the following description and drawings wherein.

Liquid springs are inherently relatively short stroke devices which are capable of absorbing very high amounts of energy for their size and weight. In certain applications, it is necessary to provide a mechanism capable of absorbing energy through a relatively long stroke and when such a situation is present, it is necessary to provide a motion multiplying system if a liquid spring is used. Both embodiments of the shock absorbers according to this invention include means to multiply the stroke capability of a liquid spring as well as means to provide damping dynamically resisting stroking movement.

Figure 1:
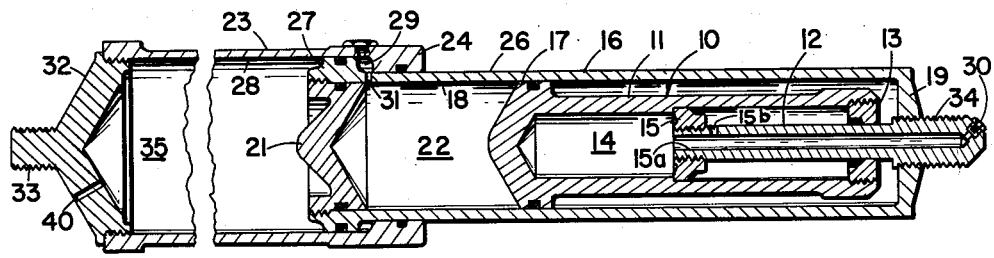
FIGURE 1 is a side elevation in longitudinal section showing one embodiment of a shock absorber according to this invention in the extended position.
Figure 2:
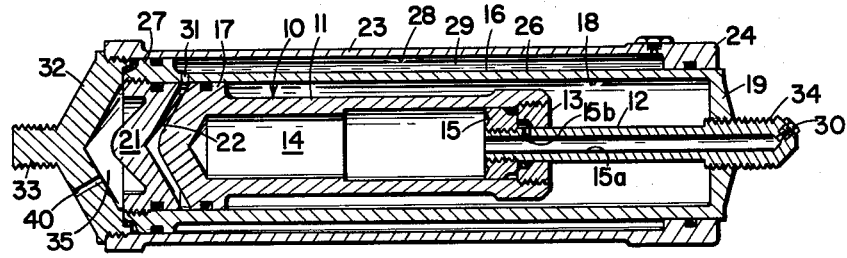
FIGURE 2 is a view similar to FIGURE 1 showing the position the elements assume in the normal static position.

Referring to FIGURES 1 and 2, the first embodiment of this invention includes a liquid spring 10 having a hollow cylinder 11 into which projects a plunger 12. A sealing assembly 13 is mounted on the outer end of the cylinder 11 and provides a dynamic sealing engagement with the outer surface of the plunger 12. The structure of the sealing assembly is not described herein in detail but preferably is of the type disclosed and claimed in the co-pending application of Arthur L. Lindow and Richard A. Graff, Serial No. 597,692 filed July 13, 1956, now Patent No. 2,960,332, and reference should be made to that application for a more detailed description of a preferred sealing assembly suitable for use in the pressure ranges encountered in liquid springs. The cylinder 11, plunger 12, and seal assembly 13 co-operate to define a cavity 14 filled with compressible liquid under pressure the volume of which is changed by relative axial movement between the cylinder 11 and plunger 12. When the liquid spring 10 is in the extended position shown in FIGURE 2, the volume of the cavity 14 is a maximum and relative movement toward the compressed position of FIGURE 1 reduces the volume of the cavity by the displacement volume of the plunger 12, thereby compressing the liquid to a higher pressure and increasing the reaction force tending to move the cylinder 11 to the left as viewed in FIGURES 1 and 2. To provide lateral support for the inner end of the plunger 12, a head 15 is provided which engages the inner wall of the cylinder 11. Fluid communication is provided between two sides of the head 15 through a passage 15a and a port 15b both formed in the plunger 12.

The liquid spring 10 is mounted within an inner telescoping member 16 and is formed with a piston head 17 which slides along the inner surface 18 of the telescoping member 16. The right end of the inner telescoping member 16 is formed with an apertured end wall 19 through which the end of the plunger 12 is threaded so the plunger 12 is fixed relative to the inner telescoping member 16 and the cylinder 11 is slidable relative thereto. The passage 15a extends through the end wall 19 so the spring 10 can be filled through a charging fitting 30 external of the unit. The left end of the inner telescoping member 16 is closed by a bulkhead 21 which, in co-operation with the piston head 17, forms a chamber 22 the volume of which is changed by relative movement between the cylinder 11 and the inner telescoping member 16.

Positioned around the inner telescoping member 16 in a telescoping relationship therewith is an outer telescoping member 23 formed with a gland portion 24 providing a sliding seal with the outer surface 26 of the inner telescoping member 16. A second gland portion 27 is formed at the inner end of the inner telescoping member 16 and is proportioned to provide sliding sealing engagement with the inner surface 28 of the outer telescoping member 23. Therefore, the two telescoping members 16 and 23 and the gland portions 24 and 27 co-operate to define an annular chamber 29 the volume of which is changed by relative axial movement between the two telescoping members 16 and 23. An orifice 31 is formed in the wall of the inner telescoping member 26 adjacent to the second gland portion 27 to provide fluid communication between the two chambers 22 and 29.

The two chambers 22 and 29 are filled with liquid when the elements are in the static position of FIGURE 2 at which time the end of the inner telescoping member 16 engages an end plate 32 screw threaded on the left end of the outer telescoping member 23. When the elements are in this position, the volume of the first chamber 29 is at a maximum, the volume of the second chamber 22 is at a minimum, and the cylinder 11 is in the extended position. If a tension load is applied between the mounting portions 33 and 34 on the end plate 32 and the plunger 12 respectively, the outer telescoping member 23 moves to the left relative to the inner telescoping member 16. This reduces the volume of the first chamber 29 and causes liquid contained therein to flow through the orifice 31 into the second chamber 22. This in turn forces the cylinder 11 to the right relative to the inner telescoping member 16 by increasing the volume of liquid within the second chamber 22. Of course, movement of the cylinder 11 to the right is resisted by the liquid compressed within the cavity 14 so the pressure of the liquid within the two chambers 22 and 29 increases as the outer telescoping member 23 extends. The two telescoping members 16 and 23 are therefore urged toward each other by a force which is a function of the effective area of the first chamber 29 times the pressure contained therein. Once the elements assume a static position, the pressures in the two chambers 22 and 29 equalize at a pressure determined by the position of the liquid spring 10. However, during extending movement of the outer telescoping member 23, a damping or dynamic force is developed by the flow of liquid through the orifice 31 which is the function of the relative velocity between the two telescoping members. Therefore, there are two distinct actions which resist extension of the outer telescoping member 23: namely, the spring action and the damping action. It should be understood that the damping action only operates during movement and that the spring provides a force urging the two telescoping members to the compressed position even when there is no relative movement therebetween.

The effective area of the first chamber 29 is equal to the area defined by the inner surface 28 minus the area defined by the outer surface 26. If the stroke of the two telescoping members 16 and 23 is to be larger than the stroke of the liquid spring 10, it is necessary to arrange the proportions so that the effective area of the first chamber 29 is smaller than the effective area of the second chamber 22 which is the area defined by the inner surface 18. As an example, if the effective area of the second chamber 22 is three times as great as the effective area of the first chamber 29, a given axial displacement between the two telescoping members 16 and 23 will produce one-third as great a displacement of the cylinder 11 relative to its plunger 12 and the inner telescoping member 16. If other ratios of stroke are desired, other ratios of areas can be used. By arranging the mechanism in this manner, it is possible to use a relatively short stroke liquid spring to produce a long stroke shock absorbing device because the liquid within the two chambers 22 and 29 is, in effect, a motion multiplying system.

Figure 4:
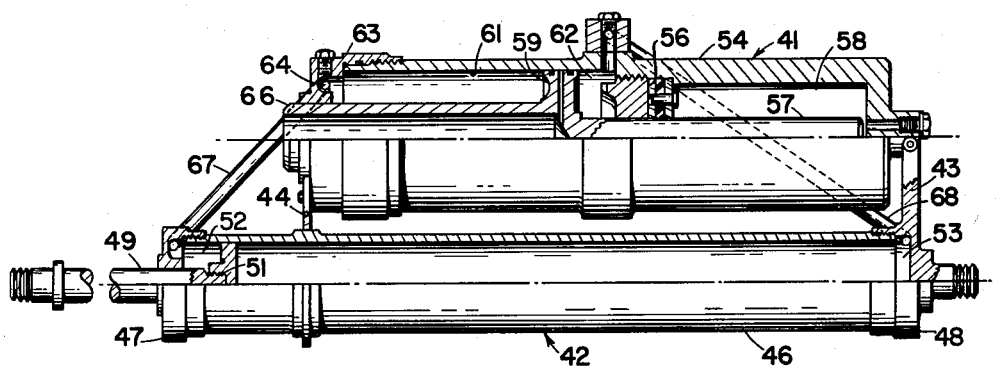
FIGURE 4 is a view similar to FIGURE 3 showing the position the elements assume when the shock absorber is extended.

When the elements are returned to the compressed position of FIGURE 2 from the extended position of FIGURE 1, the action of the liquid spring 10 causes the liquid to flow back through the orifice 31 into the first chamber 29. However, since this is not a positive displacement during compression of the two telescoping members, no damping is provided during compression. If it is desired to provide double-acting damping, that is damping in both directions, a structure of the type disclosed in the embodiment of FIGURES 4 through 6 should be utilized. To prevent the buildup of pressure in the zone 35 to the left of the bulkhead 21, a vent 40 is provided.

In the second embodiment, a liquid spring assembly 41 is mounted on a telescoping assembly 42 by brackets 43 and 44. The telescoping assembly 42 includes a cylinder 46 closed at its ends by end caps 47 and 48 and a piston 49 extending through the end cap 47. Mounted on the inner end of the piston 49 is a piston head 51 which divides the cylinder 46 into a first chamber 52 to the left of the piston head 51 and a fourth chamber 53 to the right of the piston head 51. Movement of the piston 49 to the left reduces the volume of the first chamber 52 and increases the volume of the fourth chamber 53. Conversely, movement in the opposite direction reduces the volume of the fourth chamber 53 while increasing the volume of the first chamber 52.

The spring assembly 41 includes a main housing 54 in which is positioned a gland or seal assembly 56, of the type described in the co-pending application cited above, through which projects a spring plunger 57. The main housing 54, the seal assembly 56, and the plunger 57 co-operate to define a spring cavity 58 filled with compressible liquid under pressure the volume of which is reduced by movement of the plunger to the right. Therefore, movement of the plunger 57 to the right compresses the liquid in the spring cavity 58 to a higher pressure and increases the force urging the plunger 57 to the left.

The plunger 57 is formed with a piston head 59 which slides along an inner surface 61 in the main housing 54 and in co-operation therewith provides a third chamber 62 between the seal assembly 56 and the piston head 59. The left end of the main housing 54 is closed by an end cap 63 which co-operates with the inner surface 61 and the piston head 59 to define a second chamber 64 to the left of the piston head 59. To the left of the piston head 59, the plunger 57 is formed with an extension 66 which extends through the end cap 63. When the plunger 57 moves to the right, the volume of the second chamber 64 is increased and the volume of the third chamber 62 is decreased. Conversely, when the plunger moves to the left, the volume of the third chamber 62 increases and the volume of the second chamber 64 decreases.

Figure 3:
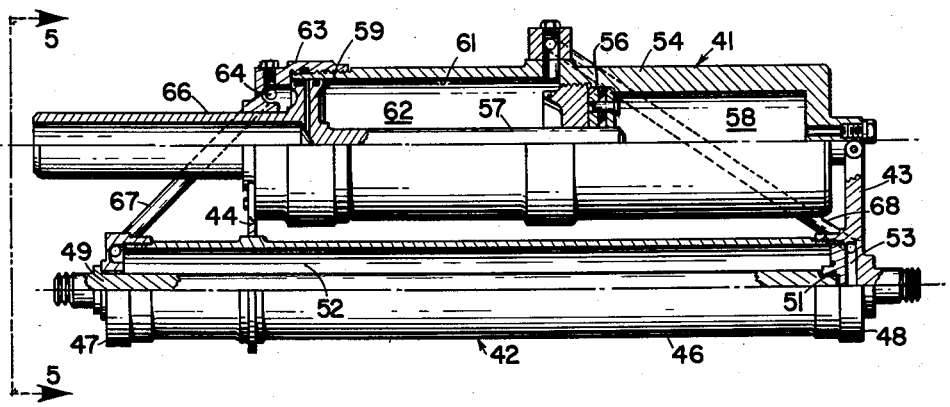
FIGURE 3 is a side elevation partially in longitudinal section showing the second embodiment of this invention in the static or compressed position.

A fluid conduit 67 connects the first chamber 52 with the second chamber 64 and a fluid conduit 68 connects the fourth chamber 53 to the third chamber 62. Therefore, when the piston 49 is moved to the left, liquid is displaced from the first chamber 52 into the second chamber 64 causing the plunger 57 to move to the right. This is the action that takes place when the elements move from the compressed position of FIGURE 3 to the extended position of FIGURE 4. During this movement, liquid is displaced from the third chamber 62 through the fluid conduit 68 to the fourth chamber 53. Conversely, when the piston 49 is moved to the right from the extended position of FIGURE 4 to the compressed position of FIGURE 3, liquid is displaced from the fourth chamber 53 to the third chamber 62 and from the second chamber 64 to the first chamber 52. Thus, there is a positive hydraulic connection between the plunger 57 and the piston 49. It is necessary to arrange the proportions so that the effective area of the first chamber 52 divided by the effective area of the second chamber 64 is equal to the effective area of the fourth chamber 53 divided by the effective area of the third chamber 62. If these ratios are maintained, the total volume of the fourth and third chambers 53 and 62 will be constant when the total volume of the first and second chambers 52 and 64 is constant and the device operates freely.

Figures 5, 6:
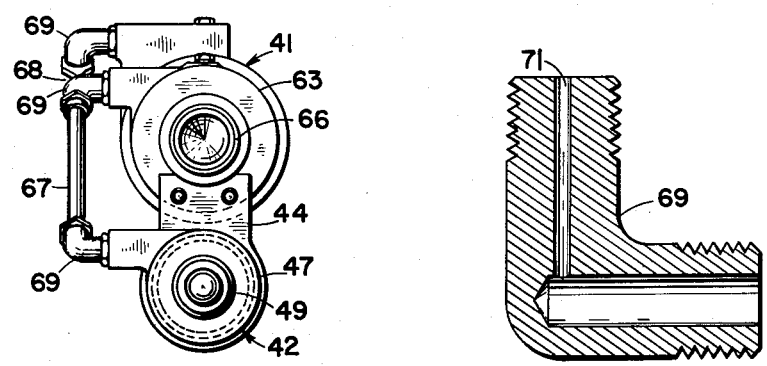
FIGURE 5 is an end view taken along 5—5 of FIGURE 3.
FIGURE 6 is an enlarged view in longitudinal section of the damping orifice used in the second embodiment of FIGURES 3 through 5.

The effective area of the second chamber 64, however, should be greater than the effective area of the first chamber 52 so that the plunger 57 will not move through as great a distance under the influence of the movement of the piston 49 so that motion multiplying will again be present. In this embodiment, the action of the compressed liquid within the spring cavity 58 produces a resilient force urging the plunger 57 to the left which pressurizes the liquid in the second chamber 64 and the first chamber 52 and automatically produces a resilient force urging the pinion 49 to the right. If desired, damping can be provided to resist movement of the piston 49 in both directions by providing flow restriction in one or both fluid conduits 67 and 68. In the illustrated device, a fitting 69 in the fluid conduit 67 is formed with a restricted orifice 71 as shown in FIGURE 6. Since there is a positive displacement of liquid when the piston 49 moves in both directions which causes a positive displacement of the plunger 57, damping will be provided by the flow of liquid through the restricted orifice 71 for both directions of movement of the piston 49. However, the spring action of the device is essentially the same in both embodiments.

Because liquid springs have a very high energy absorption capacity for a given size and weight, the resulting mechanism is relatively small and light. Also, since the area of the liquid spring plungers in both embodiments is relatively small when compared to the piston head area which pressurizes the low pressure liquid, the pressures encountered in the damping circuits is relatively low so normal O-ring type seals can be used for all of the seals except the liquid spring seal. The system has the advantage of permitting long stroke shock absorption by the use of the hydraulic motion multiplying concept so that the advantages of a liquid spring are usable without any of the inherent short stroke disadvantages.

Although preferred embodiments of this invention are illustrated, it will be realized that various modifications of the structural details may be made without departing from the mode of operation and the essence of the invention. Therefore, except insofar as they are claimed in the appended claims, structural details may be varied widely without modifying the mode of operation. Accordingly, the appended claims and not the aforesaid detailed description are determinative of the scope of the invention.

I claim:

1. A shock absorber comprising a pair of telescoping members adapted to be connected to a load co-operating to define a first chamber the volume of which is changed by movement between said members, a liquid spring including first and second co-operating elements movable relative to each other, means co-operating with said first element to define a second chamber the volume of which is changed by relative movement between said elements for compression and extension of said liquid spring, an effective area for each of said chambers, the effective area of said second chamber being larger than the effective area of said first chamber, a passage connecing said chambers, and liquid filling said chambers which is incompressible at normal operating pressures whereby relative movement between said members in one direction displaces liquid through said passage from said first chamber to said second chamber to produce movement of said first element relative to said second element to compress said spring.

2. A shock absorber comprising a pair of telescoping members adapted to be connected to a load, spaced seal means between said members co-operating therewith to define a chamber the volume of which is reduced by relative movement therebetween in a first direction elongating said members, a liquid spring including co-operating cylinder and plunger elements resiliently urged in a second direction relative to each other tending to move said elements apart, means co-operating with one of said elements to define a second chamber the volume of which is decreased by relative movement between said elements in said second direction, orifice means connecting said chambers, and liquid filling said chambers which is incompressible at normal operating pressures whereby relative movement between said members in said one direction displaces liquid through said orifice means from said first chamber to said second chamber for increasing the volume of said second chamber producing movement of said first element relative to the other of said elements in a direction opposite said second direction.

3. A shock absorber comprising a pair of telescoping members adapted to be connected to a load, spaced seal means between said members co-operating therewith to define an annular chamber the volume of which is reduced by relative movement therebetween in a first direction elongating said members, a liquid spring including co-operating cylinder and plunger elements resiliently urged in a second direction relative to each other tending to move said elements apart, a second chamber defined in part by one of said elements the volume of which is decreased by relative movement between said elements in said second direction, an effective area for each of said chambers, the effective area of said second chamber being larger than the effective area of said first chamber, a passage connecting said chambers, and liquid filling said chambers which is incompressible at normal operating pressures whereby relative movement between said members in said one direction displaces liquid from said first chamber to said second chamber for increasing the volume of said second chamber producing movement of said first element relative to the other of said elements in a direction opposite said second direction.

4. A shock absorber comprising a pair of telescoping members, seal means between said members co-operating therewith to define first and fourth chambers, the volume of said first chamber decreasing and the volume of said fourth chamber increasing upon relative movement between said members in one direction, a pair of telescoping elements, seal means between said elements co-operating therewith to define second and third chambers, the volume of said second chamber decreasing and the volume of said third chamber increasing upon relative movement of said elements in a given direction, a liquid spring resiliently urging said elements in said given direction, fluid conduits connecting said first chamber to said second chamber and said third chamber to said fourth chamber, a flow restriction in at least one of said conduits, and a liquid filling said chambers which is substantially incompressible at normal operating pressures.

5. A shock absorber comprising a pair of telescoping members, seal means between said members co-operating therewith to define first and fourth chambers each having an effective area, the volume of said first chamber decreasing and the volume of said fourth chamber increasing upon relative movement between said members in one direction, a pair of telescoping elements, seal means between said elements co-operating therewith to define second and third chambers each having an effective area, the volume of said second chamber decreasing and the volume of said third chamber increasing upon relative movement of said elements in a given direction, a liquid spring resiliently urging said elements in said given direction, fluid conduits connecting said first chamber to said second chamber and said third chamber to said fourth chamber, a flow restriction in at least one of said conduits, the effective area of said first chamber divided by the effective area of said second chamber being equal to the effective area of said fourth chamber divided by the effective area of said third chamber, and a liquid filling said chambers which is substantially incompressible to normal operating pressures.

6. A shock absorber comprising a pair of telescoping members, seal means between said members co-operating therewith to define first and fourth chambers each having an effective area, the volume of said first chamber decreasing and the volume of said fourth chamber increasing upon relative movement between said members in one direction, a pair of telescoping elements, seal means between said elements co-operating therewith to define second and third chambers each having an effective area, the volume of said second chamber decreasing and the volume of said third chamber increasing upon relative movement of said elements in a given direction, a liquid spring resiliently urging said elements in said given direction, fluid conduits connecting said first chamber to said second chamber and said third chamber to said fourth chamber, a flow restriction in at least one of said conduits, the effective area of said second chamber being greater than the effective area of said first chamber and the effective area of said first chamber divided by the effective area of said second chamber being equal to the effective area of said fourth chamber divided by the effective area of said third chamber, and a liquid filling said chambers which is substantially incompressible at normal operating pressures.

7. A shock absorber comprising inner and outer hollow telescoping members, spaced seal means between said members co-operating therewith to define an annular chamber having an effective area the volume of which is reduced by relative movement between said members in one direction, a liquid spring including cylinder and plunger elements projecting thereinto co-operating to define a spring cavity filled with compressed liquid resiliently urging said plunger and cylinder elements apart, a mount fixing one of said elements to said inner member, the other of said elements engaging the inner wall of said inner member and in co-operation therewith defining a second chamber having an effective area greater than the effective area of said first chamber, the volume of said second chamber being increased by movement of said elements toward each other, a flow restriction connecting said chambers, and liquid filling said chambers which is substantially incompressible at normal operating pressures whereby relative movement between said members in said one direction causes flow of liquid from said first chamber through said restriction into said second chamber compressing said spring.

8. A shock absorber comprising inner and outer hollow telescoping members, spaced seal means between said members co-operating therewith to define an annular chamber the volume of which is reduced by relative movement between said members in one direction, a liquid spring including a cylinder and a plunger projecting thereinto co-operating to define a spring cavity filled with compressed liquid resiliently urging said plunger and cylinder apart, a mount fixing said plunger to said inner member, said cylinder engaging the inner wall of said inner member and in co-operation therewith defining a second chamber, the volume of said second chamber being increased by movement of said cylinder toward said plunger, a flow restriction connecting said chambers, and liquid filling said chambers which is substantially incompressible at normal operating pressures whereby relative movement between said members in said one direction causes flow of liquid from said first chamber through said restriction into said second chamber compressing said spring.

9. A shock absorber comprising inner and outer hollow telescoping members, spaced seal means between said members co-operating therewith to define an annular chamber having an effective area the volume of which is reduced by relative movement between said members in one direction, a liquid spring including a cylinder and a plunger projecting thereinto co-operating to define a spring cavity filled with compressed liquid resiliently urging said plunger and cylinder apart, a mount fixing said plunger to said inner member, said cylinder engaging the inner wall of said inner member and in co-operation therewith defining a second chamber having an effective area greater than the effective area of said first chamber, the volume of said second chamber being increased by movement of said cylinder toward said plunger, a flow restriction connecting said chambers, and liquid filling said chambers which is substantially incompressible at normal operating pressures whereby relative movement between said members in said one direction causes flow of liquid from said first chamber through said restriction into said second chamber compressing said spring.

References Cited in the file of this patent

UNITED STATES PATENTS

| | | |
|---|---|---|
| 2,560,005 | Shawbrook et al. | July 10, 1951 |
| 2,785,887 | Taylor et al. | Mar. 19, 1957 |
| 2,815,008 | Hirt | Dec. 3, 1957 |
| 2,849,227 | Stenstrom | Aug. 26, 1958 |
| 2,873,963 | Taylor | Feb. 17, 1959 |
| 2,930,608 | Hogan et al. | Mar. 29, 1960 |
| 2,943,642 | Westcott | July 5, 1960 |